United States Patent [19]

Oberst

[11] 4,389,133
[45] Jun. 21, 1983

[54] PLASTIC CONNECTORS FOR CORRUGATED MATERIAL

[75] Inventor: Steven M. Oberst, Willard, Ohio

[73] Assignee: Acorn Corrugated Box Co., Bedford Park, Ill.

[21] Appl. No.: 241,661

[22] Filed: Mar. 9, 1981

[51] Int. Cl.³ .......................... B25G 3/00; F16B 7/08; F16B 9/00; F16L 41/00
[52] U.S. Cl. .................................. 403/230; 403/199; 403/201; 403/407; 403/331; 220/22.3; 220/75; 248/222.4
[58] Field of Search ............... 403/230, 199, 201, 406, 403/407, 409, 331; 220/22.3, 75, 76; 248/222.4, 223.4, 235, 247, 248

[56] References Cited

U.S. PATENT DOCUMENTS

| | | | |
|---|---|---|---|
| 2,103,106 | 12/1937 | Yurkovitch | 248/223.4 |
| 2,620,248 | 12/1952 | Mutchnik | 403/407 X |
| 2,828,046 | 3/1958 | Weinman | 220/76 |
| 2,952,343 | 9/1960 | Modrey | 248/223.4 X |
| 3,106,994 | 10/1963 | Scott | 403/DIG. 10 |

Primary Examiner—Wayne L. Shedd
Attorney, Agent, or Firm—James J. Jennings

[57] ABSTRACT

Corrugated panels are intercoupled by a male and a female connector, each having a part received in its respective panel. The female connector has a U-shaped receiving volume, with a receiving slot in the front portion. The male connector has a pair of flanges connected by a rib. When assembled one flange is inserted in the receiving volume, and the rib is in the receiving slot. Two female connectors can be mated, by inverting one and inserting a part of its front portion into the receiving volume of the other female connector.

8 Claims, 5 Drawing Figures

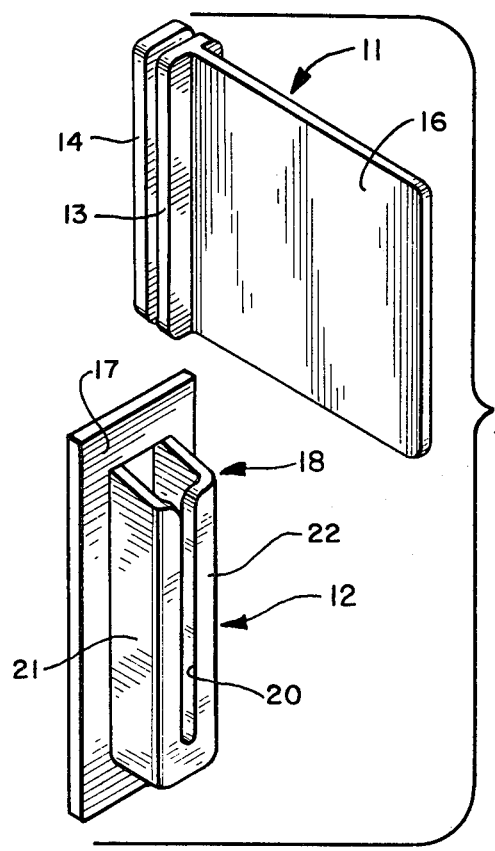
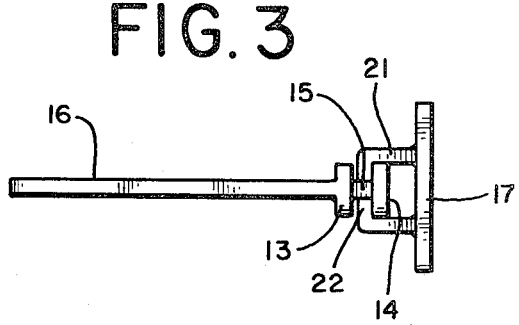
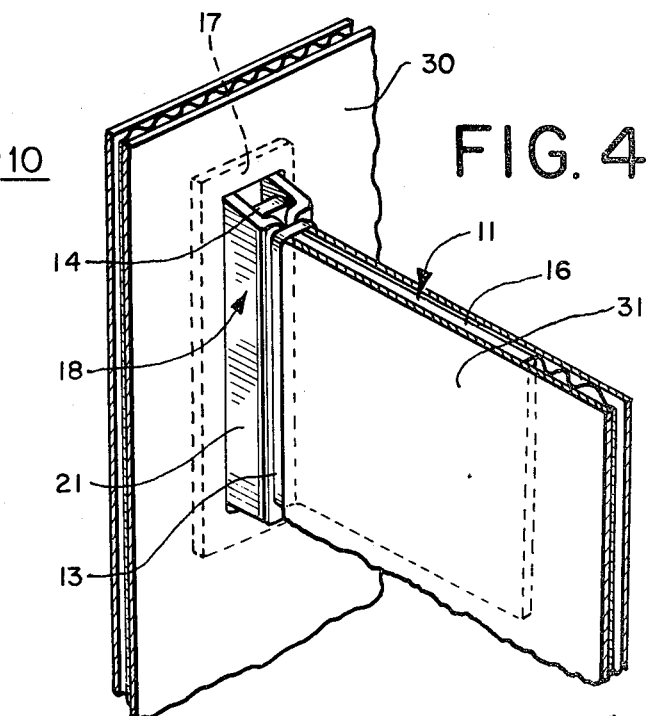
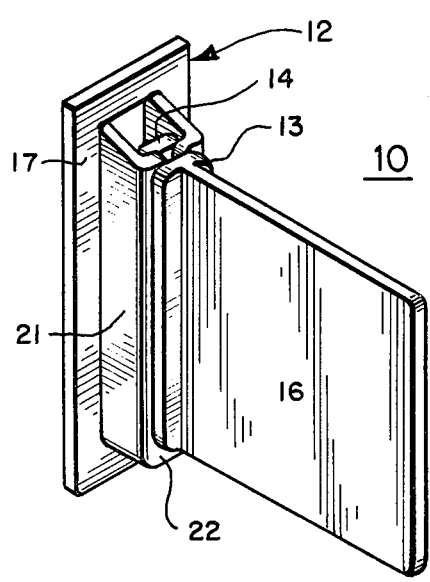
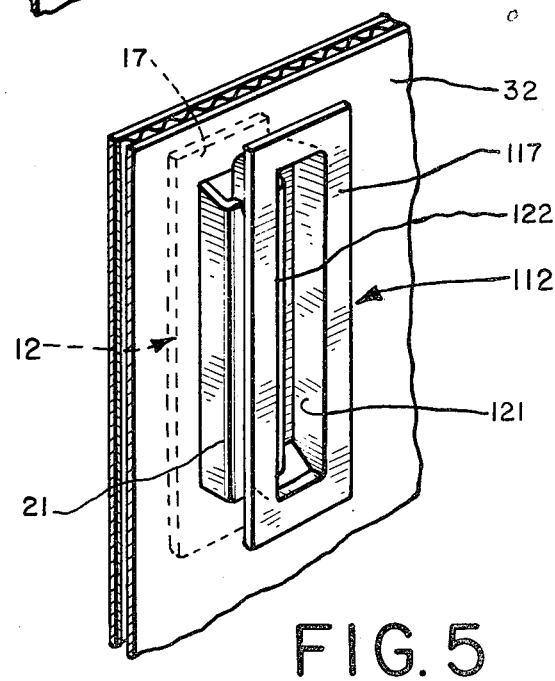

PLASTIC CONNECTORS FOR CORRUGATED MATERIAL

BACKGROUND OF THE INVENTION

The use of corrugated material for packaging has long been known, and in addition the same material is frequently used for displays. Corrugated material is generally fairly sturdy, being comprised of a pair of spaced apart liners separated by the corrugating material. This material is woven back and forth between the layers to provide substantial strength and load-bearing ability to the corrugated panel itself, and thus to whatever structures are formed with individual corrugated panels. The strength of such corrugated material has been so appreciated that in addition to displays and simple shelf arrangements, modular furniture and other utilitarian items have also been made from the corrugated material. However, one substantial drawback to the use of corrugated panels is the necessity for interlocking the mating panel sections in some way. Various types of devices have been tried in an effort to effect such interlocking, but none have the solved the need in the corrugated industry.

It is therefore a principal consideration of this invention to provide a plastic connector arrangement for use with corrugated material which can simply and positively interlock two adjacent panels or sections of corrugated material.

Another important consideration of the present invention is to provide such connectors which are simple and economical to manufacture.

Yet another significant consideration of the present invention is to provide such connectors with sufficient flexibility so that two panels can be supported whether they intersect at substantially right angles or are supported parallel to each other.

SUMMARY OF THE INVENTION

An assembly for intercoupling pieces of corrugated material when constructed in accordance with the present invention comprises a female connector and a male connector. The female connector includes a back portion which has a thickness dimension suitable for insertion between the liners of the corrugated panel. The female connector also has a generally U-shaped receiving portion, extending outwardly from the back portion and defining a receiving slot. The receiving slot is open at the top and closed at the bottom. The U-shaped receiving portion is thus uninterrupted except for (1) the receiving slot, (2) the top portion, and (3) the back portion. The male connector includes first and second flange portions, spaced from each other and interconnected by a rib. The rib thickness is substantially smaller than the width of the flanges, and is sized to fit within the receiving slot of the female connector. The male connector also includes a leaf portion, affixed to one of the flanges and extending substantially perpendicular to that flange. This leaf is received in another panel of the corrugated material, to support the two panels at right angles with respect to each other.

In accordance with another aspect of the invention, an assembly can be comprised of two female connectors. In this arrangement one of the female connectors is inverted so that a part of its receiving portion passes through the receiving slot of the other connector, forming an assembly for supporting a second corrugated panel adjacent the first panel.

THE DRAWING

In the several figures of the drawing, like reference numerals identify like components, and in that drawing:

FIG. 1 is a perspective view, depicting male and female connectors constructed according to the invention;

FIG. 2 is a perspective view depicting the connectors of FIG. 1 joined in an assembly;

FIG. 3 is a top view of the joined assembly depicted in FIG. 2;

FIG. 4 is a perspective illustration, similar to that of FIG. 2, but showing the corrugated material in conjunction with the connectors of the invention; and FIG. 5 is a perspective illustration depicting another embodiment of the invention in which two female connectors are utilized.

DETAILED DESCRIPTION OF THE INVENTION

FIG. 1 illustrates a male connector 11 spaced apart from a female connector 12. When these two connectors are joined, they will comprise an assembly 10 as also depicted in FIGS. 2 and 3.

The male connector 11 of FIG. 1 comprises a front flange portion 13 and a rear flange portion 14. These first and second flanges are spaced from each other and connected by a rib portion 15, better seen in FIG. 3. This rib has a thickness substantially smaller than the width of the first and second flanges 13, 14 and, as will be seen hereinafter, is sized to fit within a receiving slot of the female connector. In the male connector, a leaf portion 16 is affixed to flange 13 and extends substantially perpendicular to this flange. Leaf 16, like the other components of the invention, has a thickness approximately 1/16 inch so that it can readily fit between the liners of most corrugated material available today.

Female connector 12 includes a back portion 17 which is generally rectangular and lies in a reference plane. Like the leaf portion 16 the male connector, the back portion 17 has a thickness suitable for receipt within the liners of a piece of corrugated material. A generally U-shaped receiving portion 18 extends outwardly from the back portion 17 and defines a receiving slot 20 therein.

This slot is sized to receive the rib 15 of the male connector as previously described.

Receiving portion 18 actually comprises a generally U-shaped wall portion 21 which extends substantially perpendicular to back portion 17 as shown. In addition receiving portion 18 comprises a front portion 22 which defines receiving slot 20. Together wall portion 21 and front portion 22 define a receiving volume of the appropriate dimension so that flange 14 can comfortably fit in this volume when rib 15 is received within slot 20.

FIGS. 2 and 3 depict the assembly formed when the second or rear flange 14 of male connector 11 is inserted into the receiving volume defined by wall portion 21 and front portion 22 of female connector 12. Receiving slot 20 is made slightly larger, of the order of 15 percent, than the thickness of rib 15 so that the two pieces are readily mated as shown. The illustration of FIG. 3 sets out both connectors in dimensions very close to that actually used in a preferred embodiment. By making all the thicknesses, particularly of leaf 16 of the male connector and back portion 17 of the female connector approximately 1/16 inch, these components are readily received in the area normally occupied by the corrugating medium or between the liners of a suitably scored corrugated panel. This is better shown in FIG. 4.

As there shown a side wall panel, of which a segment 30 is depicted, is to be mated with another corrugated panel 31. Back portion 17 of the female connector is first inserted in the panel 30, and similarly leaf portion 16 of the male connector is inserted into a part of panel 31. After this is accomplished, male connector 11 is raised with its attached panel 31 and the rear flange 14 inserted into the receiving volume of the female connector, as previously described. Those skilled in the art will readily appreciate that the same assembly technique can be followed if the panel 31 is to be in the horizontal plane, or at some plane inclined with respect to the horizontal.

FIG. 5 depicts another assembly in which two corrugated panels are to be aligned in parallel planes. Only one panel designated 32 is depicted in FIG. 5 for simplicity of illustration. Female connector 12 is inserted into panel 32 in the same manner as it was inserted in the assembly of FIG. 4. However, in accordance with another aspect of the invention, a second female connector 112, of precisely the same dimensions and configuration as the first connector 12, is provided. After being inserted in its respective panel (not shown), the second connector 112 is inverted so that its front portion 112, or more specifically one-half of the front portion as separated by the receiving slot, is received in the receiving volume of first female connector 12. In other words, a portion of the front section 22 of a conventional connector functions much like the rear flange 14 of the male connector, being received within the well defined by the wall portion and front portion of the first female connector 12. This emphasizes the flexibility of the invention, and the particular utility of the female connector which can mate with either the male connector or another female connector.

In the embodiments described and claimed herein, the connectors were formed of a plastic material, such as high-impact styrene, or polypropylene. Those skilled in the art will understand other materials of similar properties can be used in the production of the connectors according to this invention.

While only particular embodiments of the invention have been described and claimed herein, it is manifest that various alterations and modifications may be made therein. It is therefore the intention in the appended claims to cover all such modifications and alterations as may fall within the true spirit and scope of the invention.

What is claimed is:

1. A female connector for use with a corrugated material, comprising:
    a back portion having a thickness dimension suitable for insertion in the corrugated material; and
    a generally U-shaped receiving portion, extending outwardly from said back portion and defining a receiving slot therein, which receiving slot is open at the top and closed at the bottom, and the U-shaped receiving portion is uninterrupted except for the receiving slot, top and back portion.

2. A female connector as claimed in claim 1, in which said receiving portion includes a generally U-shaped wall portion extending substantially perpendicular to said back portion, and a front portion substantially perpendicular to said wall portion, which front portion defines the receiving slot and, with the wall portion, defines a receiving volume.

3. A female connector as claimed in claim 2, in which said back portion is generally rectangular, lies in a reference plane, and has a thickness at least slightly less than the thickness of the corrugated material, and said front portion lies in a plane substantially parallel to the reference plane.

4. A female connector for use with a corrugated material, comprising:
    a generally rectangular back portion having a thickness dimension suitable for insertion in the corrugated material, which back portion lies in a reference plane and has a thickness at least slightly less than the thickness of the corrugated material; and
    a generally U-shaped receiving portion, including a generally U-shaped wall portion extending substantially perpendicular to said back portion, and a front portion integral with and extending substantially perpendicular to said wall portion and parallel to the reference plane, which front portion defines a receiving slot and, with the wall portion, defines a receiving volume, said receiving slot being open at the top and closed at the bottom, and said wall and front portions being uninterrupted except for the receiving slot, top and back portion.

5. An assembly for intercoupling pieces of corrugated material, comprising:
    a female connector, including a back portion having a thickness dimension suitable for insertion in one piece of the corrugated material,
    a generally U-shaped receiving portion, extending outwardly from said back portion and defining a receiving slot therein, which receiving slot is open at the top and closed at the bottom; and
    a male connector, including
    first and second flange portions, spaced from each other,
    a rib portion interconnecting the flange portions, which rib portion has a thickness substantially smaller than the width of said flanges, and
    a leaf portion affixed to one of said flanges on the side opposite the side to which the rib is joined, which leaf portion extends substantially perpendicular to the flange for receipt in another piece of the corrugated material.

6. A male connector for use with a corrugated material, comprising:
    first and second flange portions, spaced from each other;
    a rib portion interconnecting the flange portions, which rib portion has a thickness substantially smaller than the width of said flanges; and
    a leaf portion, affixed to one of said flanges on the side opposite the side to which the rib is joined, which leaf portion extends substantially perpendicular to the flange for receipt in the corrugated material.

7. A male connector as claimed in claim 6, in which said flange portions are in planes substantially parallel each other, and in which the flange portions have rounded corner areas to facilitate mating with another connector.

8. An assembly for intercoupling pieces of corrugated material, comprising:
    a first female connector, including a back portion having a thickness dimension suitable for insertion in one piece of the corrugated material, and a generally U-shaped receiving portion, extending outwardly from said back portion and defining a receiving slot therein, which receiving slot is open at the top and closed at the bottom, so that the U-shaped receiving portion is uninterrupted except for the receiving slot, top and back portion; and
a second female connector, including a back portion having a thickness dimension suitable for insertion in another piece of the corrugated material, and
a generally U-shaped receiving portion, extending outwardly from said back portion and defining a receiving slot therein, which receiving slot is open at the top and closed at the bottom, so that the U-shaped receiving portion is uninterrupted except for the receiving slot, top and back portion, such that an assembly is completed by inverting the second female connector and inserting a part of the second connector receiving portion into the U-shaped receiving portion of the first connector.

* * * * *

Disclaimer and Dedication

4,389,133.—*Steven M. Oberst*, Willard, Ohio. PLASTIC CONNECTORS FOR CORRUGATED MATERIAL. Patent dated June 21, 1983. Disclaimer and Dedication filed July 5, 1984, by the assignee, *Clinton Plastics, Inc.*

Hereby disclaims and dedicates to the Public the entire term of said patent.
[*Official Gazette October 2, 1984.*]